Nov. 19, 1935.　　　　F. SCHULTZ　　　　2,021,265
TRACTOR WHEEL RIM
Filed June 11, 1935　　2 Sheets-Sheet 2

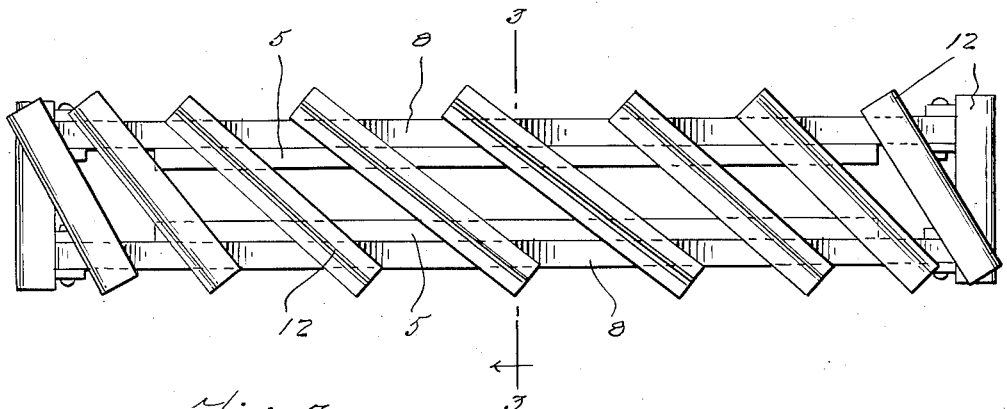
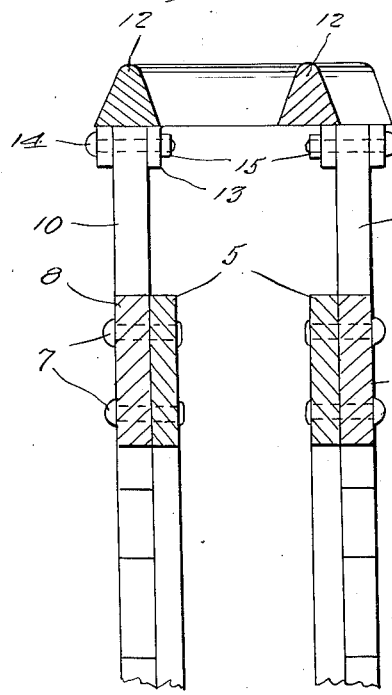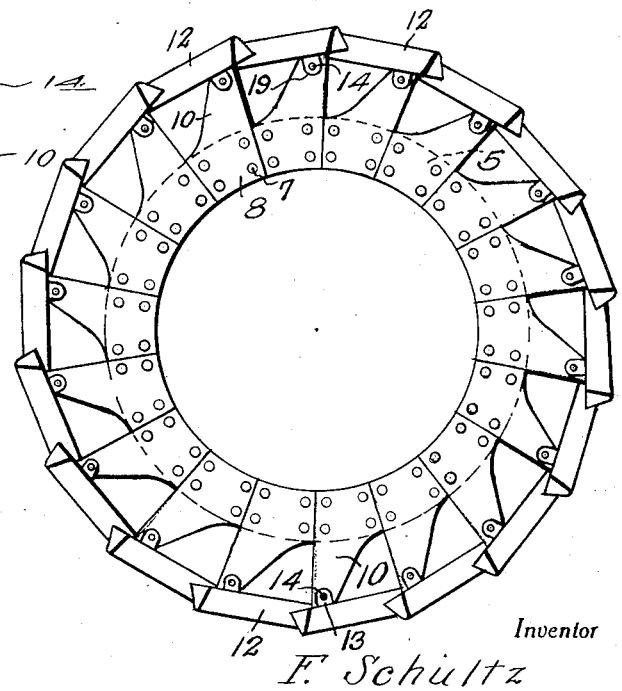

Inventor
F. Schultz
By Clarence A. O'Brien
Attorney

Patented Nov. 19, 1935

2,021,265

UNITED STATES PATENT OFFICE 2,021,265

TRACTOR WHEEL RIM

Fredrich Schultz, Pesotum, Ill.

Application June 11, 1935, Serial No. 26,057

1 Claim. (Cl. 301—52)

This invention appertains to new and useful improvements in tractor rims and more particularly to a wheel which will serve in various soil consistencies including soft earth and mud without the likelihood of picking up this material with the resultant decrease in traction.

The principal object of the present invention is to provide a tractor rim which will materially increase traction under various operating conditions and which because of its unique construction is capable of being repaired quickly and at low cost.

Other important objects and advantages of the invention will become apparent to the reader of the following specification.

In the drawings:

Figure 1 represents a side elevational view of the rim without the hub and spoke assembly.

Figure 2 represents a tread elevational view of the rim.

Figure 3 represents a sectional view taken substantially on line 3—3 of Figure 2.

Figure 4:
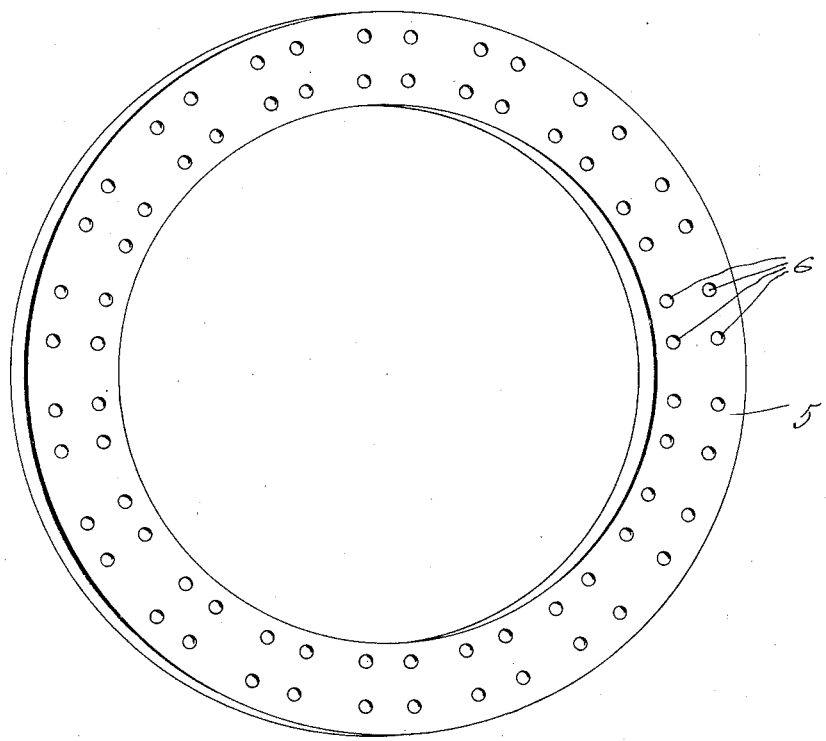
Figure 4 represents a perspective view of one of the angular members.

Referring to the drawings wherein like numerals designate like parts it can be seen that the wheel proper consists of a pair of annular members 5—5, each provided at spaced intervals with a group of four openings 6 through which securing elements 7 can be disposed for securing the segmental shaped plate 8 to the annulus. These plates 8 are secured to the outer side of the annulus and each is provided with openings 9 for receiving the aforementioned securing elements 7. Each of the plates 8 is provided with an outwardly extending protuberance disposed toward one side of the longitudinal axis of the plate and each of these protuberances 10 is provided with an opening 11 at the outer end portion thereof.

Figure 5:
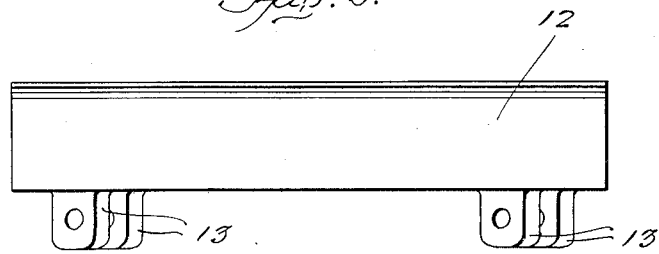
Figure 5 represents a side elevational view of one of the ground engaging cleats.
Figure 6:
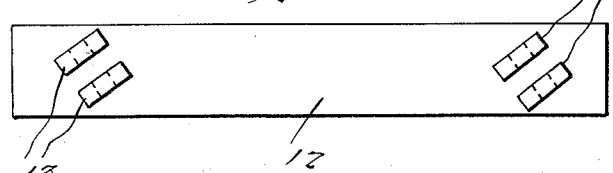
Figure 6 represents an inside plan view of one of the cleats.

In Figure 5 numeral 12 represents one of the cleats which is intended to be obliquely disposed across the peripheral portions of the annular members 5—5 and attached to the protuberances 10 in a manner substantially shown in Figures 2 and 3. The inner side of each edge portion of the cleat 12 is provided with a pair of obliquely disposed and spaced ears 13 and each pair of ears 13 engages down over the apertured end of a corresponding protuberance 10 and suitable securing elements, preferably bolts 14 equipped with nuts 15 are disposed through the registering openings of the ears 13 and protuberance 10. The cleats are detachably connected to the protuberances 10 and are disposed obliquely across the peripheries of the annular elements 5—5. Furthermore, it will be observed that the plates are readily removable from the protuberances and each is of substantially V-shape in cross section as is apparent in Figure 3.

Obviously, due to the manner in which the cleats are mounted on protuberances, as shown in Figure 1, there is practically no likelihood of mud collecting between the cleats, clogging up the same so that traction efficiency is decreased.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

A traction wheel rim comprising a pair of axially spaced annular members, segmental shaped plates secured in abutting relation surrounding the said annular members, each of said segmental plates being provided with a reduced outstanding protuberance, cleat members each having one end connected to the reduced radial outer end of a protuberance on one annular member and the other end connected to the reduced radial outer end of a protuberance on the other annular member, and being disposed obliquely with respect to the peripheries of the said annular members.

FREDRICH SCHULTZ.